United States Patent
Ruan

(10) Patent No.: US 9,149,030 B2
(45) Date of Patent: Oct. 6, 2015

(54) METHOD AND DEVICE FOR TERMITE DETECTION AND CONTROL

(71) Applicant: Mifang Ruan, Rockville, MD (US)

(72) Inventor: Mifang Ruan, Rockville, MD (US)

( * ) Notice: Subject to any disclaimer, the term of this patent is extended or adjusted under 35 U.S.C. 154(b) by 181 days.

(21) Appl. No.: 13/865,336

(22) Filed: Apr. 18, 2013

(65) Prior Publication Data

US 2014/0311017 A1    Oct. 23, 2014

(51) Int. Cl.
*A01M 1/02* (2006.01)
*A01M 1/20* (2006.01)
*A01M 1/24* (2006.01)

(52) U.S. Cl.
CPC ............... *A01M 1/2011* (2013.01); *A01M 1/02* (2013.01); *A01M 1/026* (2013.01); *A01M 1/20* (2013.01); *A01M 1/24* (2013.01)

(58) Field of Classification Search
CPC ......... A01M 1/00; A01M 1/02; A01M 1/103; A01M 1/20; A01M 1/2011; A01M 1/24
USPC ................... 43/107, 121, 124, 131, 132.1
See application file for complete search history.

(56) References Cited

U.S. PATENT DOCUMENTS

| | | | | |
|---|---|---|---|---|
| 2,899,771 A * | 8/1959 | Burns | .......................... | 52/169.14 |
| 2,952,938 A * | 9/1960 | Abrams | .......................... | 52/517 |
| 5,359,806 A * | 11/1994 | Jeffery et al. | ................... | 43/131 |
| 5,860,266 A * | 1/1999 | Martinet et al. | ............. | 52/741.3 |
| 5,899,018 A * | 5/1999 | Gordon et al. | ................... | 43/131 |
| 5,937,571 A * | 8/1999 | Megargle et al. | ............... | 43/131 |
| 6,182,412 B1 | 2/2001 | Traxler | | |
| 6,195,934 B1 | 3/2001 | Megargle et al. | | |
| 6,526,692 B2 | 3/2003 | Clark | | |
| 6,606,816 B2 * | 8/2003 | Oi et al. | .......................... | 43/131 |
| 6,803,051 B1 * | 10/2004 | Voris et al. | ..................... | 424/406 |
| 7,051,474 B1 * | 5/2006 | Tesh | ............................. | 43/132.1 |
| RE39,223 E | 8/2006 | Toutountzis | | |
| 7,247,311 B2 * | 7/2007 | Stein et al. | ..................... | 424/403 |
| 2009/0300968 A1 | 12/2009 | Zajac et al. | | |
| 2010/0325972 A1 | 12/2010 | Poston | | |
| 2012/0047792 A1 * | 3/2012 | Sala et al. | ........................ | 43/131 |

OTHER PUBLICATIONS

Miller, Dini M. "Subterranean Termite Biology and Behavior." Virginia Cooperative Extension. Virginia Tech. Publication No. 444-502. 2002.

* cited by examiner

*Primary Examiner* — David Parsley

(57) ABSTRACT

This is a new method in detection and control of subterranean termites. This method involves building underground stations. To build a station, dig a small area (e.g., 18"×18") of ground about 1" to 4" deep; then place termite feed or bait or mix of them on the bottom; cover with a plastic sheet; and finally cover it with soil, mulch, or turf. Cardboard can be used as feed among other choices. This method is very effective because the plastic sheet can keep moisture from escaping and preserve the feed/bait. Also when termites are foraging to find food, they will be stopped by the plastic sheet and be gathered there. The layer above the plastic sheet provides good insulation to disturbance. Larger size of the station than a traditional baiting container also helps termites to find the station more quickly and more reliably.

2 Claims, 3 Drawing Sheets

METHOD AND DEVICE FOR TERMITE DETECTION AND CONTROL

BACKGROUND OF THE INVENTION

1. Field of the Invention

The present invention relates to the detection and control of subterranean termites in an effective way.

2. Description of Prior Art

For subterranean termite control, there are generally two types of commonly used methods—barriers and baits. Barrier methods generally involve building up a barrier around the property to be protected so that termites will not be able to enter the property. A barrier may be chemical which will kill or repel termites or can be physical which uses materials that termites cannot pass through. U.S. Pat. No. RE39,223 to Toutountzis offers a physical barrier technique using mesh sheets. The commonly used chemical barriers include Termidor® that is manufactured by BASF Corp of Research Triangle Park, N.C. and Premise® that is manufactured by Bayer Environmental Science of Research Triangle Park, N.C.

For termite baiting, the most popular methods involve the use of containers (referred to as stations or stakes) which are insertable into the earth and contain termite feed or bait. These containers are placed into the ground and the user will later periodically check the container to see whether termites are active on the feed or the bait. Some of the methods use non-poisonous inceptor in the beginning for termite detection, and change the materials to poisonous bait if termite activity is found. Those methods include, but not limited to, existing termite baiting solutions, such as Spectracide Terminate® Termite Detection & Killing Stakes provided by United Industries Corp. of St. Louis, Mo., Advance® termite bait system provided by Whitmire MicroGen Research Lab of St. Louis, Mo.; Exterra® system provided by Ensystex, Inc. of Fayetteville, N.C.; Subterfuge® termite bait provided by BASF Corp of Research Triangle Park, N.C.; Sentricon® Colony Elimination System provided by Dow AgroSciences LLC of Indianapolis, Ind.; Hex-Pro™ termite baiting system provided by Dow AgroSciences LLC of Indianapolis, Ind., and FirstLine GT® Plus Termite Bait Station provided by FMC Corp. of Philadelphia, Pa.

The termite baiting methods using containers can also be used for termite detection. The disadvantage of those methods is that it will generally take longer time for termites to find the stations or stakes; or the stations or stakes can never been found before decomposed; thus the result is a lower reliability or effectiveness. It is commonly believed that termites cannot sense the food remotely. They can only find food by randomly foraging into the food sources. For those termite baiting methods that involve changing non-poisonous inceptor into poisonous bait, it will also involve significant disturbance to those termites already feeding on the inceptor and the disturbance can drive termites away.

Although the container-based termite baiting and detection methods do have the disadvantages, termite baiting methods also have certain advantages compared with barrier methods, such as a relatively lower cost, it may be more environmental friendly (compared with chemical barrier termite control techniques) and it targets the elimination of termite colonies. Although baiting solutions are normally less expensive than barrier methods, they can be still costly and many baiting solutions are available only through professional exterminators. This invention offers a simpler and more effective method for termite detection and control, so that termites can find the stations much faster.

The patent to Clark, U.S. Pat. No. 6,526,692 discloses an apparatus and method for detecting subterranean termites using a device insertable in-ground and a combustible gas detector. U.S. Pat. No 6,195,934 to Megargle et al discloses a termite baiting station with box-shaped devices for controlling termites with a known termite activity location. U.S. Pat. No 6,182,412 to Traxler and U.S. Pat. App. No. 20100325972 by Poston are more examples of physical barrier methods used for terminate control. U.S. Pat. App. No. 20090300968 by Zajac et al is another design of a device insertable into the ground for subterranean termite detection and control.

Prior art patents RE39,223 and 20100325972, disclose the use of plastic sheets as a part of barrier to termites, so that termites will not be able to enter protected properties. The prior arts have not suggested using a plastic sheet in connection with a termite detection and baiting station as taught herein.

BRIEF SUMMARY OF EMBODIMENTS OF THE INVENTION

Subterranean termites need moisture to live; they do not like to be disturbed; and they love to eat materials which contain cellulose. As discussed above, it is commonly believed that termites cannot sense food remotely. Consequently, termites reply on foraging to find the food sources. When a food source is found, termites can leave colony specific trace for recruiting other termites in the colony to the location. Information about termite behaviors can be found in Miller, Dini M. "Subterranean Termite Biology and Behavior." Virginia Cooperative Extension. Virginia Tech. Publication Number 444-502. 2002.

An objective of this invention is to provide a simple and effective way of termite detection and control.

An embodiment of the invention involves the construction of a number of "stations" around the periphery of a structure. Each station contains a food layer of termite feed, termite bait, or combination of termite feed and bait. Termite feed is harmless to termites and termite bait is poisonous to termites. In basic embodiment, the food layer directly contacts the earth. The food layer is covered with a containing layer, such as plastic sheet. The combined food layer and containing layer are buried underground by an insulation layer about 1 to 4 inches deep.

The method described is a particularly effective method to attract termites because the containing layer prevents moisture from escaping, so that the area under the containing layer is more humid than the surroundings; termites are attracted to humid environments. In addition, the containing layer serves to preserve the termite feed, bait or the combination, so that the feed or bait will last longer. The food layer of termite feed, bait or the combination of food and bait under the containing layer provides a concentrated rich food source for termites, so that when termites find the location they will recruit other termites to the station location.

The size of the station is significantly larger than conventional container-based baiting stations, so that termites can more easily locate the station by foraging activities. In a preferred embodiment, the station size is 18"×18".

The containing layer also helps to retain termites in a fixed area because termites are not able to pass through the layer. When termites enter the station they are more likely to stay under the containing layer where plenty of food and moisture exist. The insulation layer above the containing layer provides good insulation to the outside disturbances, so that termites feel safe in the station.

For termite detection, the food layer contains termite feed without termite bait. After the station is built, the user can periodically check on the station by lifting the containing layer and observing whether termites are active in the station. It is recommended to check for activity biweekly or monthly. If termites are living nearby a particular property, they will very likely show up in the station within two to four weeks after the station is constructed.

For termite control, a user may choose to build the station initially including termite bait or to build the station initially including termite feed without termite bait. If the station is built initially including termite bait, the food layer might also contain termite feed or it might not contain termite feed. An advantage of constructing stations initially with termite bait is that it is not necessary to inspect whether termites are active in the station after the station is built because if the termites are active they will be properly controlled without further intervention assuming enough bait is provided initially. However, there are stricter requirement of slower-acting poison in the bait, so that the affected termites can recruit other termites to the station before they die.

If the station is initially built without termite bait, the station is initially constructed in the same manner as it is for termite detection. When termites are found active in the station, a user may then add bait on top of the termite feed and then cover back with the containing layer and the insulation layer. In this way, the disturbance to termites will be minimal. This method is preferred if the user is not certain that the poison in the bait is acting slowly enough. Also this method is more environmental-friendly and more economical because no poisonous termite bait is needed unless termites are active in the station. In addition, if no bait is used initially the process can be initiated before purchasing of termite bait. Termite bait needs to be purchased only when termites are found active in the stations.

DETAILED DESCRIPTION OF EMBODIMENTS OF THE INVENTION

The present invention includes a method for termite detection and control and a device. The invention involves constructing devices as in-ground stations used to detect and control termites in virtually any ground locations.

Three drawings are provided to explain and illustrate the principles of the invention and are not in proportional scales. The stations are shown in squares for simplicity and are recommended, but they can be created in any other shapes including polygons, oval, circular or rectangular.

Figure 1:
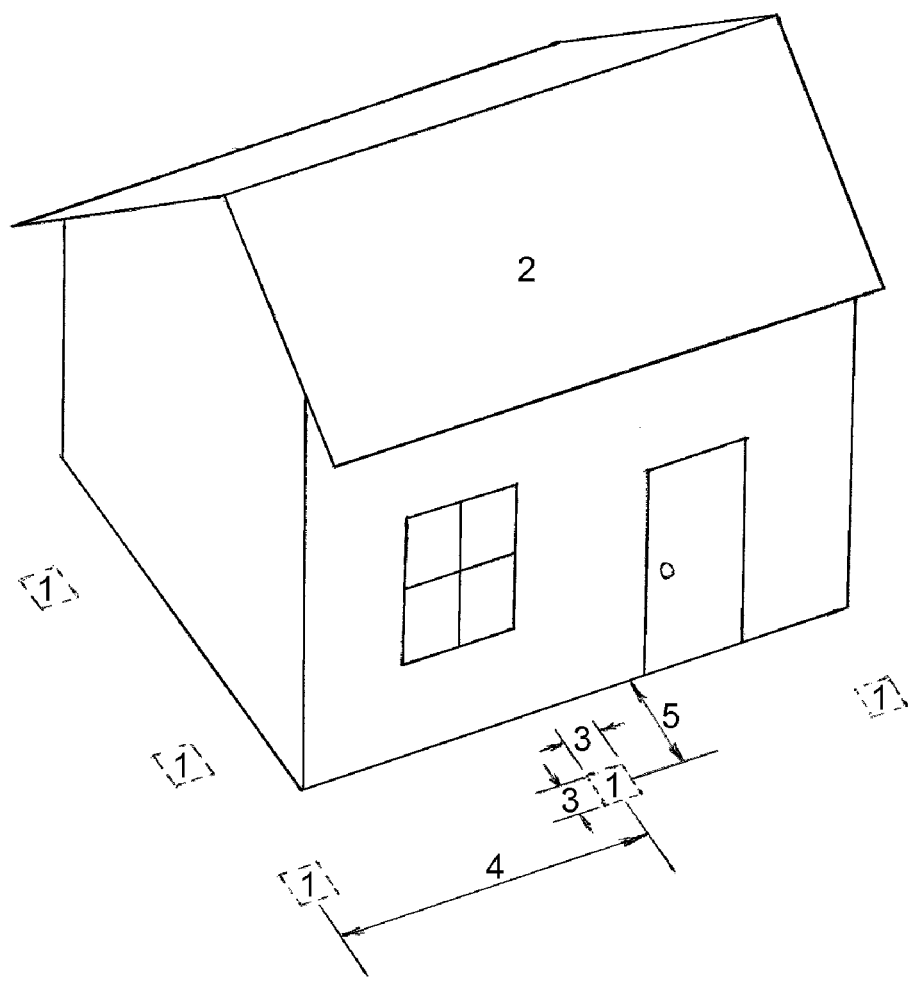
FIG. 1 is a perspective view of stations constructed around a structure to be protected by the system of the invention.

For protecting a structure, the stations are constructed around the structure as shown in FIG. 1, where a series of stations 1 is constructed around structure 2. In a preferred embodiment, a square station can be used and it has a side length 3, which is about 18". It is contemplated that the stations may effectively be constructed that have sides anywhere from 6 inches to 30 inches. The distance 4 between neighboring stations and the distance 5 between the station and the foundation of the structure that is intended to be protected can vary. In a preferred embodiments the space between neighboring stations is 10 to 15 feet; the distance between the station and foundation of the structure is 3 to 5 feet. For a single family house which has a foundation with a circumference of approximately 120-200 feet, approximately 10 to 15 stations should be constructed around the structure. Although it is preferred to construct stations around the entire perimeter of the property, the stations can be constructed in selected locations that are more termite-prone to achieve certain degree of success. Some examples of termite-prone areas are those in proximity to damper areas, shrub and flower beds, and places for piling materials.

Figure 2:
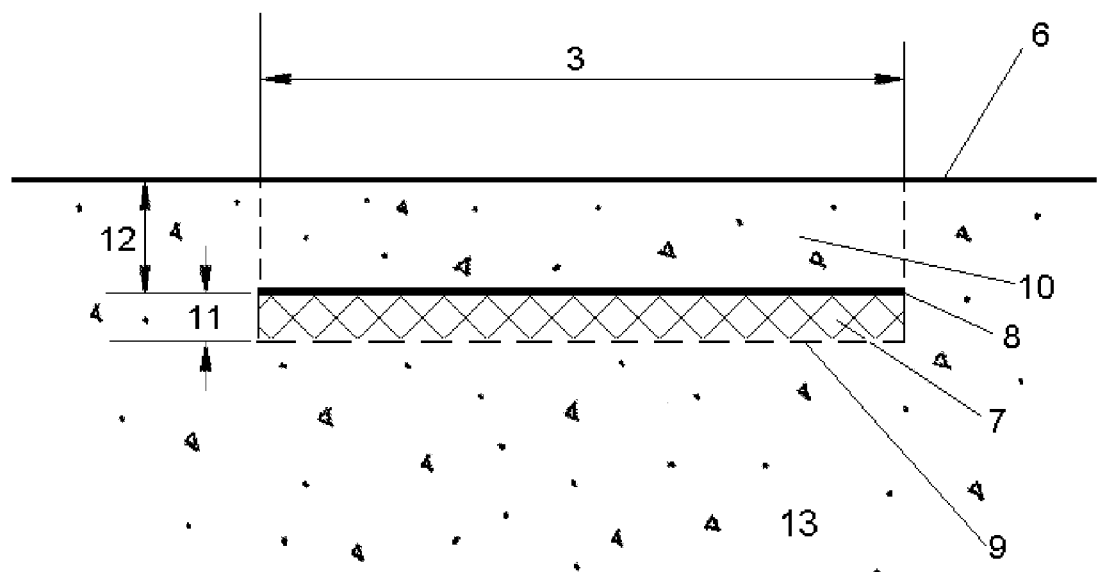
FIG. 2 is a sectional view of a station according to an embodiment of the invention.

FIG. 2 shows a sectional view of an embodiment of a station. Station is built within the ground or surrounding terrain 6. It contains a food layer 7. In embodiments the food layer may comprise termite feed or termite bait or a combination of termite feed and bait. The food layer can directly contacts the earth 13 or optionally a protection layer 9 can be added between the food layer 7 and the earth 13. On top of the food layer is a containing layer 8; and on top of containing layer is an insulation layer 10. The thickness 11 of the combined food layer 7, containing layer 8 and optional protection layer 9 is normally less than an inch. The insulation layer has a thickness 12 and extends downward from the surrounding terrain. It is contemplated that the thickness of insulation layer can be anywhere from ¼ inches to 12 inches. Limited effects might also be achieved without the insulation layer.

The containing layer 8 is comprised of a plastic sheet or other materials that is impervious to water or resistant to water. It is termite resisting, meaning that termites will not normally be able to pass through the material. Termite resisting is contrasted with termite repellent materials which drive termites away. The containing layer needs to be at least moderately termite resisting, but it does not require 100% guarantee. Plastic sheets with 4 mils or thicker are recommended. Other materials can also be used, such as aluminum foils, plastic boards, acrylic boards or vinyl. Containing layer does not contain termite repellant. In embodiments, the plastic sheets can be transparent or black or other colors. The insulation layer 10 is recommended to use whatever was originally found in the station location, such as wood mulch, soil, or lawn turf, so that the landscape appearance will not be altered. If the station is located in middle of lawn, the thickness 12 of insulation layer is recommended to be about 4 inches to allow lawn continue to grow, in other places it is recommended to be 1 to 2 inches.

Figure 3:
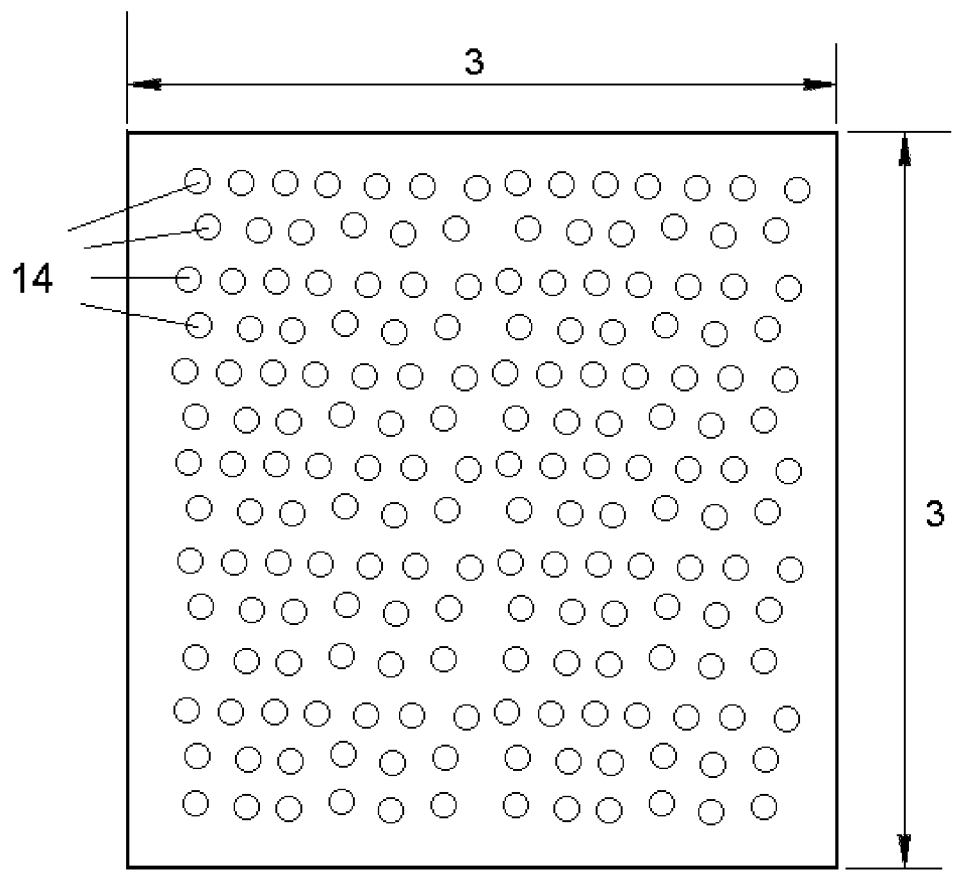
FIG. 3 is an embodiment of the optional protection layer.

FIG. 3 shows an embodiment of the optional protection layer 9 which is placed underneath the food layer and can provide additional protection to the food layer. The protection layer can be made of plastic sheet, plastic board, acrylic boards, vinyl or other materials that are not termite repellent and will not be decomposed easily. The protection layer contains a plurality of holes or openings 14 which can be evenly or randomly distributed, so that termites can pass easily from the earth to the food layer. In an embodiment, the protection layer can be a plastic sheet with punched holes.

To build a station 1, a user will first clear the location to reveal the earth and preferably dig slightly into the ground a pit that has a depth of approximately one to two inches and has an area of approximately 300 square inches (about 18"× 18"). If the station is located in middle of lawn, the user can create the pit by digging out the lawn turf about 4" deep. The bottom of the pit should be essentially flat and horizontal. If the ground is dry, it is recommended to water the pit thoroughly after it is created. Next the user can optionally place a protection layer 9 on the bottom of the pit. Then a food layer 7 is provided on the top of protection layer 9 or on the bottom of the pit if no protection layer is used, so that termites can directly access the food layer from the earth 13 or access the food layer from earth 13 through the holes or openings 14 on the protection layer 9. Next, on top of the food layer 7, a containing layer 8 (such as a plastic sheet) is provided. On top of the containing layer 8, an insulation layer 10 is provided so that the top of the station is about even or raised slightly with respect to the surrounding terrain. It is essential that the protection layer contains holes or openings, while the containing layer should not contain holes or openings.

For termite detection, the food layer 7 contains termite feed without termite bait. Termite feed can be cardboard or other termite favored food sources. If cardboard is used, it is recommended to cover the station bottom with 1 to 2 layers of cardboard. After the stations are built, the user should periodically check the station by lifting the containing layer to examine any termite activities. It is normally enough to check back biweekly or monthly for a period of one to two months. Alternatively, sensors might be used to detect the existence of termites in the station. One example of a sensor is a combustible gas detector. In this regard, according to the teachings in U.S. Pat. No. 6,526,692, termites produce combustible gases. In another example, two metal plates/sheets can be placed against each other in opposite sides of food layer. Wires are attached to the plates/sheets to construct a capacitor. When termites eat away the food layer, the capacitor reading will change. Using the same arrangement, when termites eat away the food layer, the metal plates/sheets can contact each other or separated by termite wastes, so that the resistance reading will change. Measuring the resistance can also detect the existence of termites.

For termite control, the food layer can still be constructed initially containing termite feed without termite bait in the same way as termite detection. When termite activity is found in the station, termite bait can be added to the top of termite feed and cover back with containing layer 8 and insulation layer 10. In this way, the disturbance to termites will be the very minimal. Additional termite feed might be provided when adding termite bait. Alternatively, if the termite bait is acting slowly enough so that the affected termites can still live long enough to recruit other termites to the station, the station can be built initially with the bait or with the combination of bait and feed. In this way, it is not necessary to check back to examine the existence of termites in the station assuming that enough bait is provided initially. If both termite bait and feed are used during station construction, it is recommended to place termite bait on top of termite feed. If termites are found active in the station, it is recommended to maintain termite bait in the station for at least 60 days.

The food layer, the containing layer and the insulation layer are normally essential. Other non-termite-repellent additions can optionally be added to the station for special purposes. The protection layer and sensors are examples of optional additions. Another potentially useful addition is ant bait. Ants may occupy stations and they can drive away termites. To kill ants without negatively affecting termite detection and baiting, ant bait can be added to any layer under the containing layer. Preferably ant bait is added to the bottom of the station, or it can also be added around the station. Termites normally do not consume ant bait, however when the chemical in the ant bait is absorbed by the termite feed, the combination could become a type of termite bait. This may or may not be a desired effect. The bottom line is that the ant bait must be non-termite-repellent and the chemical in the ant bait must be non-poisonous or slow acting poisonous to termites, so that termites will not be driven away or be killed too quickly.

A variety of types of termite baits can be used. Termite bait is normally produced by treating termite feed with termiticide. To make the bait successful, the termiticide needs to be slow acting and normally needs to have a low concentration, and it must be non-termite-repellent. The commonly used types of termiticides include stomach poison (such as hydramethylnon, sulfluramid, and disodium octaborate tetrahydrate), nervous system poison (such as fipronil and imidacloprid), and insect growth regulator (such as noviflumuron and diflubenzuron). They all have their advantages and disadvantages. All those types of termiticides, as well as others which are non-repellent and are slow acting poison, can be used to produce termite bait for this invention. No termite repellent materials should be used in constructing the station nor should they be used nearby the station.

It is recommended that termite detection be performed once a year and termite bait should be used when termites are found active in stations. The best time to apply this method is when termites are most active. In the regions with clear seasons, the best time to apply is the spring when the flowers just start to blossom; other times from spring to fall can also be applied. In the regions without clear seasons, such as southern states of the United States, it can be applied year-round.

The termite control method described in this invention can be used alone or it can be combined with any barrier methods. When this invention is combined with barrier methods, the barrier methods can prevent termites from entering the property and this invention can be used to kill termites.

What is claimed is:

1. A method for termite detection and control using an underground station comprising the steps of:
    (a) create a pit in a surface of earthen terrain, said pit having an open circumference at the location of the surface, a circumference shape, a depth and a flat bottom surface,
    (b) add water to the pit if the pit is dry,
    (c) place a protection layer on the earthen terrain at the bottom surface of the pit, the protection layer comprising a plastic that is not termite repellant and is not decomposable,
    (d) place a food layer on top of the protection layer, the food layer comprising termite feed, the protection layer further comprising a plurality of openings that allow termites to access the food layer,
    (e) place a containing layer on top of the food layer, the containing layer containing no holes and comprising a plastic that is resistant to water and is resistant to termites without using termite repellent, the combination of the protection layer, food layer and containing layer being less than one inch thick,
    (f) place an insulation layer on top of the containing layer, the insulation layer formed from material found at the underground station location, the insulation layer being between ¼ inches to 12 inches thick so that the top of the underground station is level with the surrounding earthen terrain,
    (g) add ant bait proximate to the underground station,
    (h) check the underground station every two to four weeks for termite activity by lifting the containing layer,
    (i) if termite activity is determined, add termite bait to the top of the termite feed of the food layer.

2. The termite detection method according to claim 1, further comprising a step adding sensors for detecting termite activities in the station.

* * * * *